US008056687B2

United States Patent
Golden et al.

(10) Patent No.: US 8,056,687 B2
(45) Date of Patent: Nov. 15, 2011

(54) APPARATUS WITH ACTIVE MATERIAL SURFACE IN CONTACT WITH RHEOLOGICAL FLUID AND METHOD OF ENHANCING PERFORMANCE THEREOF

(75) Inventors: Mark A. Golden, Washington, MI (US); John C. Ulicny, Oxford, MI (US); Yang T. Cheng, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1138 days.

(21) Appl. No.: 11/833,286

(22) Filed: Aug. 3, 2007

(65) Prior Publication Data
US 2009/0032353 A1 Feb. 5, 2009

(51) Int. Cl.
*F16D 27/00* (2006.01)
(52) U.S. Cl. ................................ 192/21.5; 188/267.2
(58) Field of Classification Search .................. 192/21.5
See application file for complete search history.

(56) References Cited

U.S. PATENT DOCUMENTS 5,762,584 A * 6/1998 Daniels ............................ 482/5
7,563,334 B2 7/2009 Zhang et al.
2005/0274454 A1 * 12/2005 Extrand ...................... 156/272.4
2007/0023247 A1 2/2007 Ulicny et al.
2007/0278060 A1 * 12/2007 Kennedy et al. ............. 192/3.33

FOREIGN PATENT DOCUMENTS

SU 1479754 * 5/1989

OTHER PUBLICATIONS

Shorey et al., Design and Testing of a New Magnetorheometer, Review of Scientific Instruments, vol. 70, No. 11 (Nov. 1999).

* cited by examiner

*Primary Examiner* — David D Le
*Assistant Examiner* — Ryan Dodd
(74) *Attorney, Agent, or Firm* — Quinn Law Group, PLLC

(57) ABSTRACT

An apparatus is provided having an active material forming a surface thereof in contact with a rheological fluid. The active material is controllable to vary a surface geometry thereof between a rough or nonsmooth surface geometry to increase drag, and achieve an increase in stress transmitted through the fluid, when a field is applied, while allowing a smooth surface geometry and an associated reduction in stress transmitted through the fluid when the field is removed. A method of enhancing performance of an apparatus that includes a rheological fluid is also provided.

16 Claims, 2 Drawing Sheets

APPARATUS WITH ACTIVE MATERIAL SURFACE IN CONTACT WITH RHEOLOGICAL FLUID AND METHOD OF ENHANCING PERFORMANCE THEREOF

TECHNICAL FIELD

The invention relates to an apparatus with a rheological fluid and a mechanical assembly having an active material surface in contact with the fluid.

BACKGROUND OF THE INVENTION

Rheological fluid devices, such as magnetorheological (MR) and electrorheological (ER) fluid clutches, polishing devices, and damping mechanisms, such as shock absorbers, utilize the increased yield stress exhibited by a rheological fluid when exposed to a field (e.g., a magnetic or electrical field) in order to control the interface of two mechanical members, such as the coupling of a stator and a rotor that are relatively rotatable. The transmission of torsional or axial forces between the members is controlled by turning the field on and off. Rheological fluids include magnetorheological and electrorheological fluids, and are sometimes referral to as controllable rheological fluids or field-responsive fluids.

For example, an MR fluid is a suspension of magnetizable particles in a carrier fluid. When exposed to a sufficiently high magnetic field, and when the MR fluid is under shear flow, the magnetizable particles will line up in columns of higher concentration, aligned with the direction of applied magnetic field. It has been observed that forming a grooved surface on one or both mechanical members of a torque-transmitting device, with the grooved surface in contact with an MR fluid in an annular space between the members, enhances the stress transmitted through the MR fluid relative to that of a surface without grooves. The grooved surface creates drag in the fluid, inhibiting slip at the boundary of the fluid and the member or members having the grooved surface. The drag is thus beneficial for intended operation in "clutch on" (i.e., magnetic field applied) conditions.

SUMMARY OF THE INVENTION

An apparatus is provided that includes a rheological fluid characterized by an increase in yield stress under an applied field. The apparatus also includes a mechanical assembly, such as a clutch assembly, that is configured to provide the field. The mechanical assembly includes an active material component forming a surface in contact with the rheological fluid. The active material component has a variable surface geometry: it is characterized by a first surface geometry when the active material component is not activated and by a second surface geometry when the active material component is activated. One of the surface geometries is rougher than the other. (As used herein to describe an active material surface, "uneven", "unsmooth" or "rough" are intended to be equivalent in meaning.) Activation of the active material component is controlled so that the rougher surface geometry is on contact with the rheological fluid when the field is applied (e.g., when increased torque is desired in the case of a torque-transmitting device) and the other, relatively smooth surface geometry is in contact with the rheological fluid when the field is removed (e.g., when drag is not desirable). Preferably, the second surface geometry is the rougher surface geometry so that the active material component must be activated to provide the drag that promotes increased transfer of stress through the fluid. A surface roughness in the range of 1-500 microns, and preferably between 20 and 30 microns, may deliver optimum stress transfer enhancement. As is known to those skilled in the art, active materials, such as shape memory alloys, may be prestressed to exhibit a shape change when activated. Thus, the shape change of the active material may cause the rougher surface, which may be characterized by protrusions and/or depressions in the surface of the active material.

In a torque-transmitting clutch assembly with such an active material surface, enhanced torque capacity is achieved without the expense of machining grooves into the stator and/or rotor of the clutch to create a rough surface geometry. Furthermore, overheating of the stator and/or rotor is avoided. Overheating can occur in the absence of surface roughness due to magnetized particles dragging along the surface of the stator and/or rotor.

During "clutch off" (i.e., magnetic field removed) operating conditions of an MR clutch, the objective is to decouple the clutch members and minimize rotational resistance of the clutch (i.e., to allow the rotor to rotate relative to the stator with minimal resistance). Thus, the drag associated with a grooved clutch surface is not desirable in a "clutch off" state. According to at least one aspect of the invention, a torque-transmitting device is provided having an active material component on a surface thereof in contact with an MR fluid in order to meet the differing objectives of the "clutch on" and "clutch off" operating conditions. Activation of the active material component is controllable to vary a surface geometry thereof between a rough or nonsmooth surface geometry to increase drag, and thereby achieve the increased torque and clutch capacity associated therewith, when a magnetic field is applied, while allowing smooth surface geometry and associated reduction in drag when the magnetic field is removed (and torque transmission is not desired).

Active materials include those compositions that can exhibit a change in stiffness properties, shape and/or dimensions in response to an activation signal, which can be an electrical, magnetic, thermal or a like signal depending on the different types of active materials. Preferred active materials include but are not limited to the class of shape memory materials, and combinations thereof. Shape memory materials, also sometimes referred to as smart materials, refer to materials or compositions that have the ability to "remember" their original shape, which can subsequently be "recalled" by applying an external stimulus (i.e., an activation signal). As such, deformation of the shape memory material from the original shape can be a temporary condition. Shape memory materials such as shape memory alloys and polymers represent a class of thermally-activated smart materials that undergo a reversible phase transformation responsible for dramatic stress-induced and temperature-induced recoverable deformation behavior.

In one embodiment, a clutch assembly includes a cylindrical stator concentrically arranged with a cylindrical rotor to form an annular cavity therebetween that is filled with an MR fluid. The MR fluid couples the rotor and stator to transmit torque therebetween when the magnetic field is applied. The stator is configured to provide the magnetic field that causes magnetization of the MR fluid. It should be appreciated that the stator is not stationary. The stator is driven by a power source. The active material component forming the surface in contact with the MR fluid is on at least one of the stator and the rotor. Alternatively, multiple active material components may be used, such as on both the stator and the rotor. The active material component may be a coating on or a portion of the rotor and/or stator.

"Activation" of an active material component means that a signal or trigger is provided to begin actuation (contraction, expansion, bending or other shape change) of the active material component. The active material component used herein may be activated in any of a number of different ways. For example, the active material component may be configured to be activated by thermal activation, electrical activation, magnetic activation or chemical activation. In the case of thermal activation, viscous heating of the MR fluid which occurs due to shearing of the MR fluid when a magnetic field is applied may supply the temperature change necessary to activate the active material component. Because the MR fluid cools when the magnetic field is removed, deactivation of the active material component is thus also linked to the magnetic field (i.e., the absence thereof). In such an embodiment, the active material component may be considered "self-activating", as it responds to the temperature of the MR fluid, and no separate activation signal is required.

Exemplary shape memory materials include shape memory alloys (SMAs), electroactive polymers (EAPs) such as dielectric elastomers, ionic polymer metal composites (IPMC), piezoelectric polymers and shape memory polymers (SMPs), magnetic shape memory alloys (MSMA), shape memory ceramics (SMCs), baroplastics, piezoelectric ceramics, magnetorheological (MR) elastomers, composites of the foregoing shape memory materials with non-shape memory materials, and combinations comprising at least one of the foregoing shape memory materials. For convenience and by way of example, reference herein will be made to shape memory alloys. The shape memory ceramics, baroplastics, and the like can be employed in a similar manner as will be appreciated by those skilled in the art in view of this disclosure. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material. In the preferred embodiments of the invention, the active material component is an SMA material.

Shape memory alloys are alloy compositions with at least two different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is often called the austenite finish temperature ($A_f$). When the shape memory alloy is in the austenite phase and is cooled, it begins to change into the martensite phase, and the temperature at which this phenomenon starts is often referred to as the martensite start temperature ($M_s$). The temperature at which austenite finishes transforming to martensite is often called the martensite finish temperature ($M_f$). The range between $A_s$ and $A_f$ is often referred to as the martensite-to-austenite transformation temperature range while that between $M_s$ and $M_f$ is often called the austenite-to-martensite transformation temperature range. It should be noted that the above-mentioned transition temperatures are functions of the stress experienced by the shape memory alloy sample. Generally, these temperatures increase with increasing stress. In view of the foregoing properties, deformation of the shape memory alloy is applied preferably at or below the austenite start temperature (at or below $A_s$). Subsequent heating above the austenite start temperature causes the deformed shape memory material sample to begin to revert back to its original (nonstressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, nonstressed shape) when heated can be adjusted by slight changes in the composition of the alloy and through thermo-mechanical processing. In nickel-titanium shape memory alloys, for example, it can be changed from above about 100 degrees Celsius to below about −100 degrees Celsius. The shape recovery process can occur over a range of just a few degrees or exhibit a more gradual recovery over a wider temperature range. The start or finish of the transformation can be controlled to within several degrees depending on the desired application and alloy composition. A torque-transmitting device within the scope of the invention has been shown to function as intended with activation temperatures ranging from −40 degrees Celsius to 400 degrees Celsius.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect.

A method of enhancing performance of an apparatus that includes the mechanical assembly and rheological fluid as described above includes activating the active material component in contact with the fluid to thereby cause one of an increase or a decrease in the surface roughness of the active material component. After activating, the method further includes deactivating the active material component to cause the other of an increase or a decrease on the surface roughness of the active material component.

As disclosed, an MR clutch with a variable surface geometry may be capable of delivering a higher torque transfer (e.g., 100-400 percent increase), or the same torque transfer at a lower electrical output, or the same torque transfer but having a smaller size (e.g., having a 100 to 400 percent smaller working area), as compared to an MR clutch with smooth surfaces in contact with the MR fluid having the same size and electrical power input, and may also have less drag when torque-transfer is not desired than does an MR clutch having a permanently rough or grooved surface geometry.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
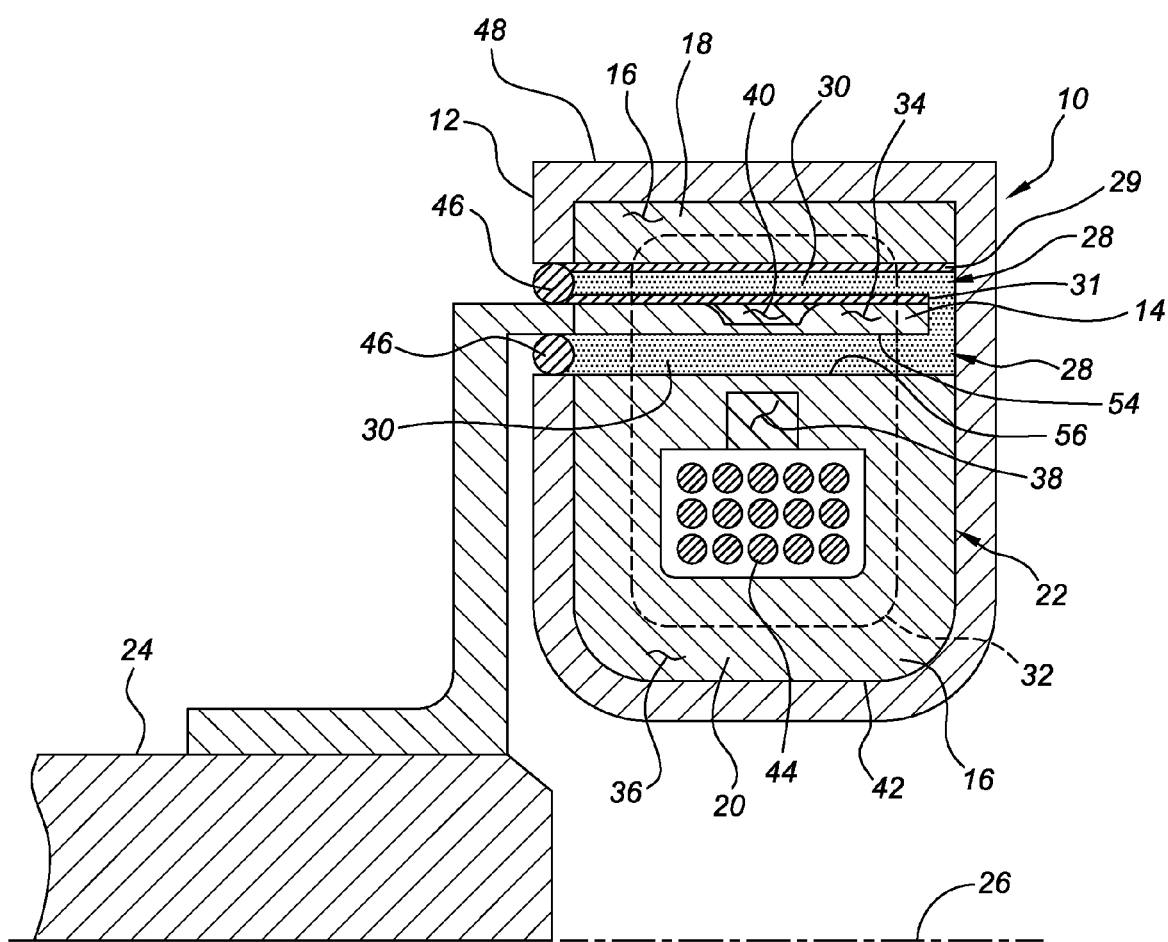
FIG. 1 is a fragmentary cross-sectional schematic illustration of a magnetorheological torque-transmitting device within the scope of the invention.

Referring to the drawings, wherein like reference numbers refer to like components, FIG. 1 illustrates an apparatus or torque-transmitting device 10, also referred to as a MR fluid coupling or an MR fluid clutch, including a mechanical assembly, which in this embodiment is a clutch assembly 12. The clutch assembly 12 includes a cylindrical rotor 14 concentrically rotatable within a cylindrical stator 16 having an outer portion 18 and a magnetic inner portion 20. A drive pulley (not shown) may be attached around the outer periphery of the stator 16 to cause it to rotate. The pulley may be driven, in turn, by a serpentine belt such as those used to power accessory items on an engine such as the air conditioner compressor, water pump, power steering pump or alternator. The stator 16 includes a magnetic field generator 22. The rotor 14, having a rotational degree of freedom with respect to the stator 16, is in direct mechanical communication with a rotatable shaft 24 that has a rotational axis 26. The shaft 24 may be a driven member of a fan, a transmission member, or any other rotatable mechanical component. The stator 16 and rotor 14 define an annular space 28, and are coupled via an MR fluid 30 disposed within the annular space 28. As discussed further with respect to FIGS. 2 and 3, two active material components 29 and 31 are formed on the stator 16 and rotor 14, respectively, in contact with the MR fluid 30 to increase the torque capacity of the torque-transmitting device 10 when in an "on" (magnetized) stare, while reducing parasitic drag of the torque-transmitting device 10 when in an "off" (unmagnetized) state. The MR fluid 30 includes a carrier fluid, depicted as the white space filling the annular space 28, and magnetizable particles suspended in the base fluid, depicted as dots within the annular space 28.

An exemplary MR fluid composition generally comprises magnetizable particles, a carrier fluid and additives. The magnetizable particles of the MR fluid composition are comprised of, for example, paramagnetic, superparamagnetic, or ferromagnetic compounds or a combination comprising at least one of the foregoing compounds. The number of magnetizable particles in the MR fluid composition depends upon the desired magnetic activity and viscosity of the fluid, but may be from about 0.01 to about 60 volume percent, based on the total volume of the MR fluid composition. In one embodiment, the number of magnetizable particles in the MR fluid composition may be from about 1.5 to about 50 volume percent, based on the total volume of the MR fluid composition. As is known, the static yield stress of MR fluids increases nonlinearly with increasing volume fraction of magnetizable particles in the MR fluid. The carrier fluid forms the continuous phase of the MR fluid composition. Examples of suitable carrier fluids are natural fatty oils, mineral oils, polyalphaolefins, polyphenylethers, polyesters (such as perfluorinated polyesters, dibasic acid esters and neopentylpolyol esters), phosphate esters, synthetic cycloparaffin oils and synthetic paraffin oils, unsaturated hydrocarbon oils, monobasic acid esters, glycol esters and ethers (such as polyalkylene glycol), synthetic hydrocarbon oils, perfluorinated polyethers, halogenated hydrocarbons, or the like, or a combination comprising at least one of the foregoing carrier fluids. Exemplary carrier fluids are those which are non-volatile, non-polar and do not contain amounts of water greater than or equal to about 5 wt %, based upon the total weight of the carrier fluid. In general, it is desirable for the MR fluid composition to have a viscosity of about 50 to about 500 centipoise at 40 degrees Celsius in the off-state. On-state yield stresses for MR fluid compositions are about 10 to about 100 kilopascals (about 1.5-to about 15 pound per square inch). These yield stresses would be measured at magnetic flux densities on the order of about 1 to about 2 tesla (that is, when the particles are magnetically saturated).

The magnetic field generator 22 is in field communication with the MR fluid 30 in the annular space 28, which is illustrated generally by flux lines 32. Stator 16 and rotor 14 include magnetic portions 34, 36, respectively, and non-magnetic portions 38, 40, respectively, which serve to guide the magnetic field in a manner suitable for the purposes disclosed herein. Magnetic portion 36 is also herein referred to as a stator portion of the magnetic field generator 22. Suitable magnetizable materials include but are not limited to iron, steel, carbonyl iron, or the like, or a combination comprising at least one of the foregoing magnetizable materials. Suitable non-magnetic materials include but are not limited to stainless steel, aluminum, brass, plastics, or the like, or a combination comprising at least one of the foregoing non-magnetic materials. Alternatively, an air gap may be employed in place of or in addition to the use of non-magnetic portions.

Magnetic field generator 22 includes a stationary magnetic core 42, and a field coil 44 that is energized via external leads and power source (not shown but well known in the art). Exemplary oil seals 46 serve to prevent leakage of the MR fluid 30 from annular space 28. A stator housing 48 retains the outer portion 18 and the magnetic inner portion 20 of the stator 16 to one another. The rotor 14 is driven by rotation of the stator 16 by torque transfer via the fluid 30 when the fluid 30 is exposed to magnetic flux generated by energizing the field coil 44. A controller, switch, or other mechanism, not shown, selectively energizes the field coil 44 when operating conditions warrant the transfer of torque.

It has been observed that, when the MR fluid is in shear flow and exposed to a sufficiently high magnetic field, the columns of magnetic particles within the MR fluid will coalesce into "stripes" or bands of particles with a high concentration. This stripe formation results in an increase in the apparent viscosity of the MR fluid, which can be as much as two to ten times larger than that of the same MR fluid without stripes. This increase in apparent yield stress or viscosity can occur because of the non-linear relationship between the static yield stress and volume fraction of magnetizable particles in the MR fluid. A corresponding torque increase in a clutch, for example, on the order of 2-4 times would be reasonable for a clutch having structure promoting the formation of stripes as compared to a clutch without such structure. The active material components described here may also promote the formation of such stripes, as described below.

In an exemplary embodiment, each of the an active material components 29, 31 form a surface in contact with the MR fluid 30 that is configured so as to promote drag at appreciable magnetic flux densities while at the same time permitting the reduction of drag of the MR fluid when it is not desired to transmit torque via the torque-transmitting device 10. The active material component 29 is a layer on the inner cylindrical surface of the stator outer portion 18. The active material component 31 is a layer on the outer cylindrical surface of the rotor 14. It should be appreciated that only one of these components may be provided in alternative embodiments, or active material component(s) could instead or in addition be provided on one or both of the inner cylindrical surface 54 of the rotor 14 and the outer cylindrical surface 56 of the inner magnetic portion 20 of the stator 16.

Figure 2:
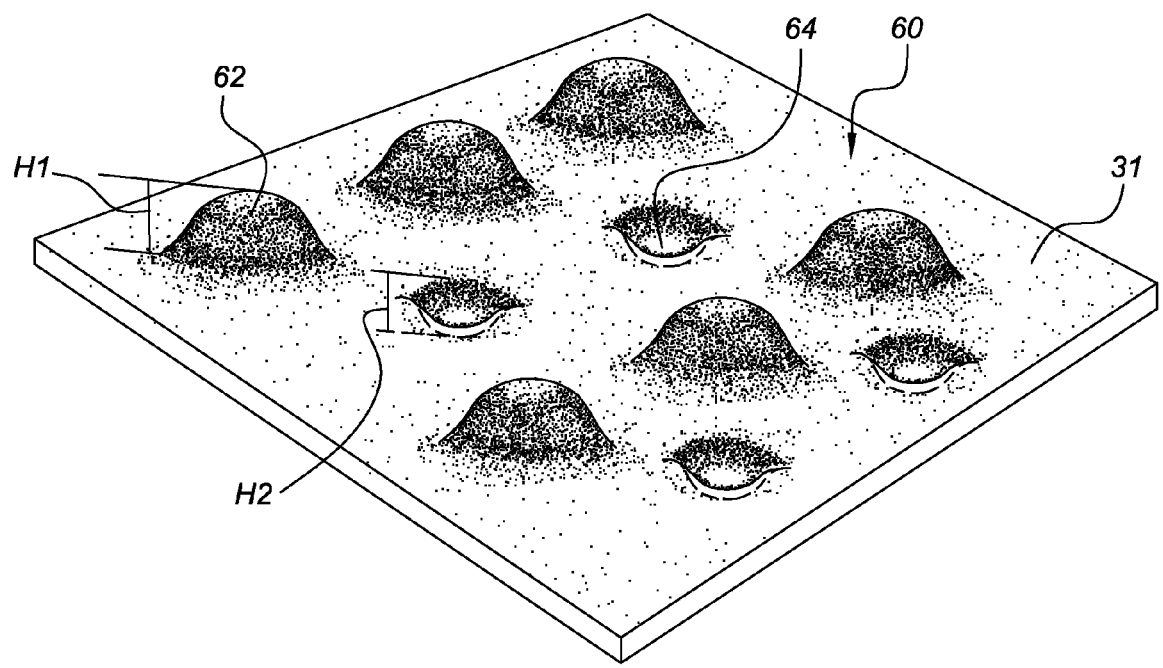
FIG. 2 is a schematic perspective illustration of a portion of an active material component in the form of a coating included on the torque-transmitting device of FIG. 1, in an activated state and having a relatively rough surface geometry.

The active material components 29, 31 are activatable and deactivatable to effect a change in surface geometry that promotes torque transfer through the MR fluid 30 within the annular space 28 in response to rotation of the rotor 14, as well as to reduce drag when torque transmission is not desired, as described below. Referring to FIG. 2, a perspective view of a portion of the active material component 31 formed as a layer on rotor 14 in contact with the MR fluid 30 in FIG. 1 reveals an active material surface 60 having a rough surface geometry characterized by protrusions 62 and depressions 64. Preferably, the active material component 31 is formed such that the protrusions 62 and depressions 64 are relatively aligned as grooves and valleys, as shown, promoting the formation of stationary flow channels to enhance striping. The surface roughness from the peak of the protrusion 62 to the base of the depression 64, represented as the peak to base height H1 of the typical protrusion 62 and the base to peak height H2 of the typical depression 64, may be in the range of 1 to 500 microns, with a preferred range of 20-30 microns, to provide the necessary surface roughness. Preferably, the surface 60 has this rough surface geometry when the active material component 31 is activated. Preferably, the active material component 31 is activated by the viscous heating of the MR fluid 30 caused by magnetization of the MR fluid 30. Alternatively, electrical wires, not shown, may be embedded in the active material component 31 such that an electrical signal, causing resistive heating, may activate the active material component 31.

Figure 3:
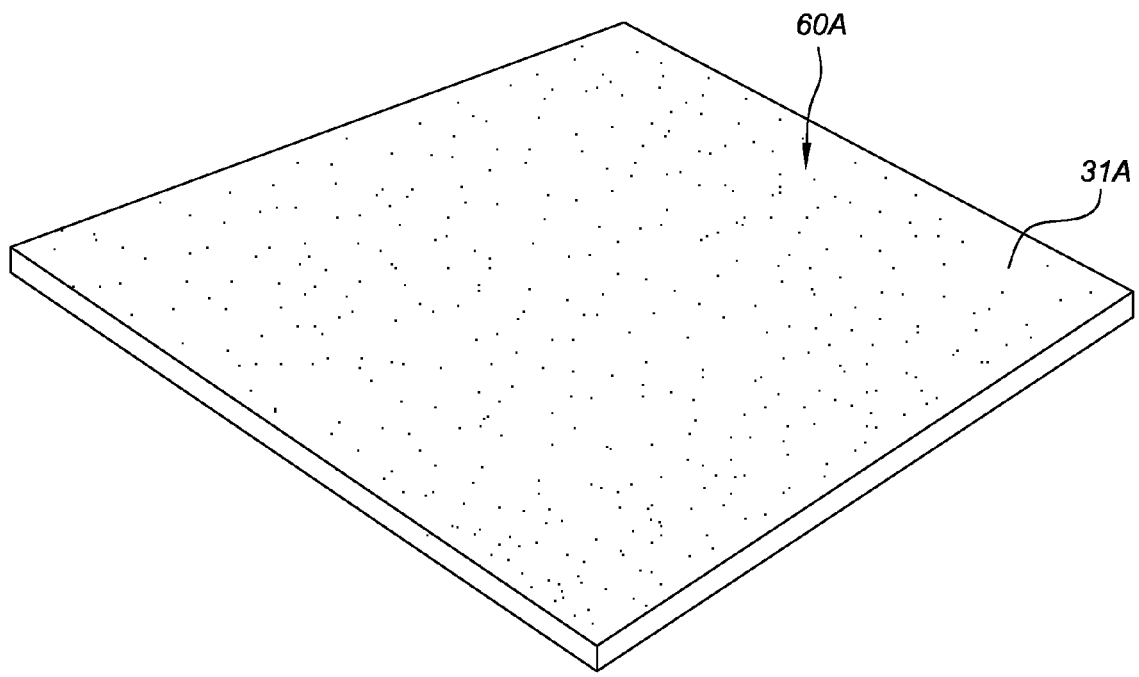
FIG. 3 is a schematic perspective illustration of the active material coating of FIG. 2 in an inactivated or deactivated state and having a relatively smooth surface geometry.

Referring to FIG. 3, the active material component is shown in an inactivated state, in which it is referenced as 31A, and in which the surface in contact with the MR fluid 30 is the same surface as that of FIG. 2 but has a relatively smooth surface geometry absent the protrusions 62 and depressions 64 of the surface geometry of FIG. 2, and therefore is referred to as 60A. The inactivated state may result from removal of the magnetic field from the torque-transmitting device 10 (i.e., the cessation of current in field coil 44), and the subsequent cooling of the MR fluid 30 in response to removal of the field. It should be appreciated that the surface 60A in contact with the MR fluid 30 may alternatively represent the activated state of the active material component 31A, while activation may cause a return to the rough surface geometry 60. In that instance, activation would be controlled to occur generally concurrently with cessation of current in field coil 44.

It should be appreciated that, although a clutch assembly for torque transmission is described herein, within the scope of the invention, an active material component forming a surface in contact with the rheological fluid in other torque transmitting applications, such as in a polishing apparatus, or in applications utilizing pressure-driven flow, such as a damping mechanism or shock absorber, may also enhance the transmission of stress through the fluid.

Thus, a method of enhancing performance of an apparatus that includes a rheological fluid, discussed with respect to the torque-transmitting device 10 of FIGS. 1-3, includes activating an active material component 31 in contact with a rheological fluid 30 to thereby cause an increase or a decrease in the surface roughness of the active material component 31 and increase or decrease, respectively, stress transmission (e.g., torque transfer) through the rheological fluid 30 in contact therewith. The method then includes deactivating the active material component 31 to thereby cause the other of an increase or decrease of the surface roughness of the active material component 31. The torque-transmitting device 10 having the active material component(s) 29, 31 described herein when operated according to the method described herein permits efficient torque transfer when in a "clutch on" state and the minimization of undesirable drag when in a "clutch off" state.

While the best modes for carrying out the invention have been described in detail, those familiar with the art to which this invention relates will recognize various alternative designs and embodiments for practicing the invention within the scope of the appended claims.

The invention claimed is:

1. An apparatus, comprising:
    a rheological fluid characterized by an increase in yield stress under an applied field;
    a mechanical assembly configured to provide the field and including an active material component forming a surface in contact with the rheological fluid; wherein the surface is characterized by a first surface geometry when the active material component is not activated and by a second surface geometry when the active material component is activated; wherein one of said first and second surface geometries is rougher than the other surface geometry; and wherein activation of the active material component is configured to be controllable such that the rougher surface geometry is in contact with the rheological fluid when the field is applied and the other of the surface geometries is in contact with the rheological fluid when the field is removed.

2. The apparatus of claim 1, wherein the mechanical assembly is a clutch assembly including a cylindrical stator concentrically arranged with a cylindrical rotor to form an annular cavity therebetween; wherein the rheological fluid is magnetorheological fluid and the field is a magnetic field; wherein the magnetorheological fluid is disposed in the annular cavity and couples the rotor and stator to transmit torque therebetween when the magnetic field is applied; and wherein the active material component forming the surface in contact with the magnetorheological fluid is a layer having a side fixed on at least one of the rotor and the stator between the at least one of the rotor and the stator and the magnetorheological fluid and another side facing the magnetorheological fluid and forming the surface, the side fixed on at least one of the rotor and the stator remaining entirely fixed when the magnetic field is applied.

3. The apparatus of claim 2, wherein the active material component is a coating on at least one of the rotor and the stator.

4. The apparatus of claim 1, wherein the rougher surface geometry is the second surface geometry; and wherein the second surface geometry includes at least one of protrusions and depressions not included in the first surface geometry.

5. The apparatus of claim 1, wherein the second surface geometry is the rougher surface geometry; and wherein the surface roughness of the second surface geometry is between 20 and 30 microns.

6. The apparatus of claim 1, wherein the active material component is a shape memory alloy.

7. The apparatus of claim 1, wherein the active material component is configured for activation by one of thermal activation, electrical activation, and magnetic activation.

8. The torque-transmitting device of claim 2, wherein activation of the active material component is thermal activation by viscous heating of the magnetorheological fluid resulting from application of the magnetic field; and wherein the magnetorheological fluid cools when the magnetic field is removed, thereby deactivating the active material component.

9. The torque-transmitting device of claim 1, wherein the rheological fluid is magnetorheological fluid; wherein the applied field is a magnetic field; and wherein the active material component is configured for activation and deactivation as a result of application and removal of the magnetic field, respectively.

10. A torque-transmitting device comprising:
first and second concentric members configured for relative rotation and having a plurality of surfaces defining an annular cavity therebetween;
a magnetorheological fluid disposed in the annular cavity; wherein the magnetorheological fluid is magnetizable to couple the first and second concentric members to transmit torque therebetween;
an active material component covering and fixed on at least one of the surfaces and having an active surface in contact with the magnetorheological fluid; wherein the active surface is characterized by a first surface geometry when not activated and a second surface geometry when activated and remains covering and fixed on said at least one of the surfaces both when activated and when not activated; wherein the first surface geometry is smoother than the second surface geometry to minimize drag on the magnetorheological fluid when the magnetorheological fluid is not magnetized; and wherein the second surface geometry increases the drag on the magnetorheological fluid when the magnetorheological fluid is magnetized.

11. The torque-transmitting device of claim 10, wherein the active material component is a shape memory alloy coating configured for thermal activation in response to viscous heating of the magnetized magnetorheological fluid.

12. A method of enhancing performance of an apparatus that includes a rheological fluid, comprising:
activating an active material component while the active material component is in contact with the rheological fluid to thereby cause one of an increase or a decrease in surface roughness of the active material component by causing protrusions and depressions that are relatively aligned on a surface of the active material component to form grooves and valleys, and thereby causing a corresponding increase or decrease in stress transferred through the rheological fluid in contact therewith.

13. The method of claim 12, wherein said activating results from a magnetic field applied to the rheological fluid.

14. The method of claim 12, further comprising:
after said activating, deactivating the active material component to thereby cause the other of an increase or a decrease in surface roughness of the active material component and thereby a corresponding increase or decrease in stress transferred through the rheological fluid in contact therewith.

15. The apparatus of claim 4, wherein the second surface geometry includes both protrusions and depressions; and wherein the active material component is configured so that said protrusions and depressions are relatively aligned to form grooves and valleys.

16. The torque-transmitting device of claim 10, wherein the second surface geometry includes both protrusions and depressions; and wherein the active material component is configured so that said protrusions and depressions are relatively aligned to form grooves and valleys.

* * * * *